(12) United States Patent
Shiotsuki et al.

(10) Patent No.: US 10,440,885 B2
(45) Date of Patent: Oct. 15, 2019

(54) MOWER BLADE
(71) Applicant: KUBOTA CORPORATION, Osaka (JP)
(72) Inventors: Motosumi Shiotsuki, Osaka (JP); Akira Minoura, Osaka (JP); Kazuo Koike, Hyogo (JP); Hirokazu Ito, Osaka (JP)
(73) Assignee: KUBOTA CORPORATION, Osaka (JP)
( * ) Notice: Subject to any disclaimer, the term of this patent is extended or adjusted under 35 U.S.C. 154(b) by 0 days.
(21) Appl. No.: 14/015,111
(22) Filed: Aug. 30, 2013
(65) Prior Publication Data
US 2014/0196428 A1 Jul. 17, 2014
(30) Foreign Application Priority Data
Jan. 15, 2013 (JP) .................................. 2013-004912
(51) Int. Cl.
A01D 34/13 (2006.01)
A01D 34/73 (2006.01)
(52) U.S. Cl.
CPC .................................... A01D 34/73 (2013.01)
(58) Field of Classification Search
CPC .................................................... A01D 34/73
(Continued)
(56) References Cited
U.S. PATENT DOCUMENTS
2,857,729 A 10/1958 Zoldok
3,788,050 A * 1/1974 Houst .................... A01D 34/73
30/347
(Continued)

FOREIGN PATENT DOCUMENTS
JP 59-26920 2/1984
JP 60-68936 5/1985
(Continued)

OTHER PUBLICATIONS
Japanese Office Action dated Jul. 29, 2016 and issued in JP Application No. 2013-004912.

Primary Examiner — Thomas B Will
Assistant Examiner — Mai T Nguyen
(74) Attorney, Agent, or Firm — Greenblum & Bernstein, P.L.C.

(57) ABSTRACT

Mower blade utilizes a blade portion formed on the blade main body and an air circulator portion formed on the blade main body and generating airflow via rotation centered around the vertically-oriented axis of the mower blade. The blade portion is arranged in a length-direction end portion of the blade main body and extends along a predetermined area in the length-direction. The air circulator portion is located opposite the blade portion in a width direction, has a rising upward portion, and extends along a predetermined area in the length-direction. A boundary portion is arranged between the blade main body and a rising upward portion of the air circulator portion has a portion inclined or angled with respect to the blade portion such that, beginning at the length-direction end portion, a distance between the boundary portion and the blade portion increases along the length-direction and moving toward the vertically-oriented axis. A height of an upper end portion of the air circulator portion measured from a surface of the blade main body is a substantially constant height.

25 Claims, 5 Drawing Sheets (58) Field of Classification Search
USPC ............ 56/17.5, 255, 295, DIG. 19, DIG. 20
See application file for complete search history.

(56) References Cited

U.S. PATENT DOCUMENTS

| | | | |
|---|---|---|---|
| 4,149,358 A | | 4/1979 | Comer |
| 4,189,903 A | * | 2/1980 | Jackson et al. ................ 56/255 |
| 4,205,512 A | * | 6/1980 | Thorud ............... A01D 34/005 56/13.4 |
| 4,257,214 A | * | 3/1981 | Ferguson ............. A01D 34/73 56/13.4 |
| 4,290,258 A | * | 9/1981 | Gobler ............................ 56/295 |
| 4,426,831 A | * | 1/1984 | Klas ..................... A01D 34/73 56/17.5 |
| 4,559,769 A | | 12/1985 | Seyerle |
| 5,209,052 A | * | 5/1993 | Carroll .......................... 56/255 |
| 5,327,710 A | * | 7/1994 | Plamper et al. ................ 56/255 |
| 5,363,635 A | * | 11/1994 | White, III ............ A01D 34/005 56/255 |
| D357,691 S | | 4/1995 | Bryant |
| 5,775,078 A | | 7/1998 | Warren |
| 5,894,717 A | * | 4/1999 | Yamashita ........... A01D 34/005 56/17.5 |
| 6,301,868 B1 | | 10/2001 | Siplinger |
| D450,066 S | | 11/2001 | Monesmith |
| D482,700 S | | 11/2003 | Lancaster |
| 6,679,039 B2 | * | 1/2004 | Deschamps ............ A01D 34/73 56/295 |
| D487,098 S | | 2/2004 | Arfstrom et al. |
| 6,769,236 B2 | | 8/2004 | Schaedler |
| 6,938,402 B2 | * | 9/2005 | Arfstrom ............... A01D 34/73 56/255 |
| 7,127,877 B2 | | 10/2006 | Curran |
| D535,666 S | | 1/2007 | Nesco |
| D574,860 S | | 8/2008 | Potts |
| D598,475 S | | 8/2009 | Roth |
| D609,251 S | | 2/2010 | Roth |
| D622,740 S | | 8/2010 | Roth |
| 7,861,503 B1 | | 1/2011 | Campbell |
| 7,866,135 B2 | * | 1/2011 | Davis ..................... A01D 34/71 56/320.2 |
| D649,981 S | | 12/2011 | Roth |
| D693,373 S | * | 11/2013 | Shiotsuki et al. ............. D15/17 |
| 2005/0172601 A1 | | 8/2005 | Besogne |
| 2005/0210852 A1 | | 9/2005 | Lancaster |
| 2005/0229573 A1 | | 10/2005 | Curran |
| 2006/0162310 A1 | | 7/2006 | Dittmer |
| 2006/0168933 A1 | | 8/2006 | Hill |
| 2011/0277438 A1 | * | 11/2011 | Perruso, Jr. ..................... 56/295 |

FOREIGN PATENT DOCUMENTS

| | | |
|---|---|---|
| JP | S61-135515 | 6/1986 |
| JP | 62-144431 | 9/1987 |
| JP | 2009-213437 | 9/2009 |

\* cited by examiner

MOWER BLADE

CROSS-REFERENCE TO RELATED APPLICATIONS

The present application claims priority under 35 U.S.C. § 119 of Japanese Application No. 2013-004912, filed on Jan. 15, 2013, the disclosure of which is expressly incorporated by reference herein in its entirety.

BACKGROUND OF THE INVENTION

1. Field of the Invention

The present invention relates to a mower blade such as a mower blade that can be rotatably driven and centered around a vertically-oriented axis in an interior of a housing.

2. Description of Related Art

A mower blade generates airflow within a housing using fan blades, with the airflow causing grass to stand upright in order to facilitate cutting, transporting the cut grass, and the like. Conventionally, this type of mower blade is described in documents such as Japanese Patent Laid-open Publication No. S61-135515 and U.S. Pat. No. 4,559,769, for example. Japanese Patent Laid-open Publication No. S61-135515 and U.S. Pat. No. 4,559,769 describe a rotary mower blade as the mower blade. The mower blade of Japanese Patent Laid-open Publication No. S61-135515 includes a cutting blade formed along a long side of a plate-shaped member and a fan blade extending parallel to the cutting blade. The mower blade of U.S. Pat. No. 4,559,769 includes a cutting blade and a fan blade. At each of two apexes of the substantially rectangular plate-shaped member, the two apexes lying along a diagonal line, the mower blade includes cutting blades spanning a predetermined area beginning at the apex and following the long side of the plate-shaped member. At two apexes lying along another diagonal line, a vicinity of the apex is given a notched shape. A predetermined area including the notched portion is folded back across the adjacent long and short sides of the plate-shaped member such that the predetermined area including the notched portion stands upright, thus forming a trapezoidal fan blade.

In the mower blade disclosed in Japanese Patent Laid-open Publication No. S61-135515, the fan blade extends parallel to the cutting blade formed along the long side of the plate-shaped member. In other words, the fan blade extends parallel to a length direction of the mower blade. Therefore, airflow caused by the fan blade moves in a rotation direction (a direction tangential to a rotation trajectory of an outside end of the mower blade) or even further outward than the rotation direction. Therefore, the mower blade may not be able to generate sufficient airflow in a transport direction of the cut grass. Meanwhile, in comparison to the fan blade extending parallel to the cutting blade formed along the long side of the plate-shaped member, the configuration described above for the mower blade of U.S. Pat. No. 4,559,769 includes the fan blade facing an interior of the rotation direction of the mower blade. Airflow directed further inward than the rotation direction (the direction tangential to the rotation trajectory of the outside end of the mower blade) can thus be caused, thus generating airflow in the transport direction of the cut grass. However, in the mower blade of U.S. Pat. No. 4,559,769, a space between a lateral side of the fan blade facing a mowing chamber wall and an opposing lateral side of the fan blade decreases toward an end of a fan blade extending from a blade main body, thus creating a tapering shape to the fan blade. Thus, insufficient airflow may be generated and a desired air circulation performance may be difficult to achieve.

In view of the above circumstances, there is an urgent need for a mower blade capable of generating airflow in an appropriate direction with superior air circulation performance.

SUMMARY OF THE INVENTION

The mower blade of the present invention includes a mower blade rotatably driven and centered around a vertically-oriented axis in an interior of a housing. The mower blade includes a blade main body, a blade portion formed on the blade main body, and an air circulator portion formed on the blade main body and generating airflow by rotation centered around the vertically-oriented axis of the mower blade. The blade portion spans from a length-direction end portion of the blade main body to a predetermined area. The air circulator portion is formed on a width-direction side of the blade main body opposite the blade portion, rising up and bent with respect to the blade main body from the length-direction end portion to a predetermined area. A boundary portion between the blade main body and a rising portion of the air circulator portion is inclined with respect to the blade portion such that, beginning at the length-direction end portion, the boundary portion grows more distant from the blade portion as the boundary portion approaches the vertically-oriented axis center. The air circulator portion spans from the length-direction end portion of the blade main body to a predetermined area such that an upper end portion of the air circulator portion has substantially a fixed height.

Herein, "an upper end portion of the air circulator portion has substantially a fixed height" may refer to a height that is effectively (though not exactly) the same. Specifically, a difference between the heights of a highest portion and a lowest portion of the height may be 30% or less of the height of the highest portion. As described above, the air circulator portion faces the interior of the rotation direction of the mower blade and can generate airflow that is directed more towards an interior than the rotation direction of the mower blade (a direction tangential to a rotation trajectory of an outside end of the mower blade). In addition, the air circulator portion spans from the length-direction end portion of the blade main body to the predetermined area such that the upper end portion of the air circulator portion has substantially a fixed height. Therefore, surface area of the air circulator portion can be increased and a space between a mowing chamber wall and the air circulator portion can be reduced. Thus, a mower blade capable of generating airflow in an appropriate direction with superior air circulation performance can be obtained.

In the above-noted configuration, a distance on the length-direction end from a cutting edge of the blade portion to the boundary portion is substantially equal to a distance, on the vertically-oriented axis center side end of the blade portion, from the cutting edge of the blade portion to a center line in the width direction of the blade main body. Specifically, in the present configuration, although the air circulator portion faces the blade portion, the distance on the length-direction end portion closest to the blade portion and the air circulator portion from the cutting edge of the blade portion to the rising portion of the air circulator portion is substantially equal to the distance on the vertically-oriented axis center side end of the blade portion from the cutting edge of the blade portion to the center line in the width direction of the blade main body. Therefore, a sufficient sharpened area of the blade portion can be reserved and the mower blade can be used for a longer time.

In the above-noted configuration, in a plan view, the boundary portion is bent in a direction increasing the inclination of the boundary portion with respect to the blade portion at an intermediate portion, and the air circulator portion is bent at a location corresponding to the bent portion. By bending the air circulator portion in the above way, strength of the air circulator portion can be increased.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
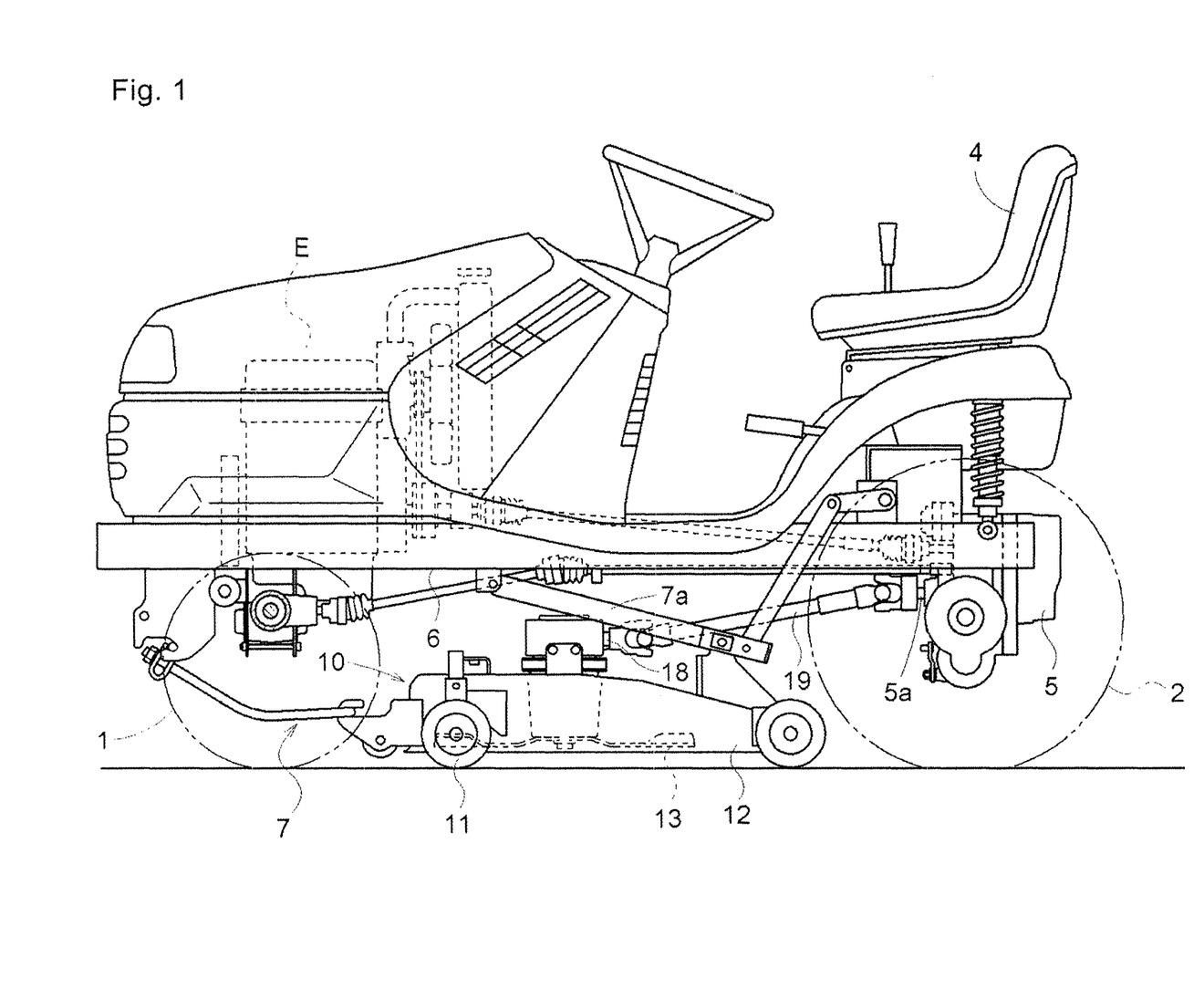
FIG. 1 is a side view illustrating an exemplary riding mower to which a mower blade according to the present invention may be utilized.

In the following description, an exemplary embodiment is described in which an embodiment of the inventive mower blade is applied to a riding lawn mower. As shown in FIG. 1, the riding lawn mower can be of the type that includes a vehicle body, a pair of left and right front wheels 1, a pair of left and right rear wheels 2, a motor section having an engine E, a cockpit in which a driver's seat 4 is installed behind the motor section, and a travel speed changing mechanism.

A propulsion mechanism 5 is utilized to change a speed of a drive force from the engine E and transmits the drive force to the front wheels 1 and rear wheels 2. Specifically, the propulsion mechanism 5 can include a hydrostatic continuously variable transmission (not shown in the drawings) that can switch the drive force from the engine E between forward and reverse travel speeds using the hydrostatic continuously variable transmission. The switched drive force can thus be transmitted to the front wheels 1 and the rear wheels 2. Moreover, speed for the drive force from the engine E can be continuously changed in both forward travel and reverse travel.

In the exemplary embodiment, a mower 10 is coupled to a vehicle body frame 6 of a vehicle body via a link mechanism 7 and is positioned between the front wheels 1 and the rear wheels 2 (below the vehicle body). A rear link 7a on the link mechanism 7 is also utilized which can swing up and down via a lift cylinder (not shown in the drawings). The link mechanism 7 can thus be lifted and lowered to control elevation of the mower 10 between a lowered work state (in which one or more gauge wheels 11 are in contact with a ground surface) and a raised idle state (in which the gauge wheels 11 hover above the ground surface). When the mower 10 is in the lowered work state, mower blade 13 located in an interior of a housing 12 of the mower 10 is rotated, thereby performing a mowing process on grass (or a lawn) while the mower blade 13 is located in the interior of the housing 12 of the mower 10.

Figure 2:
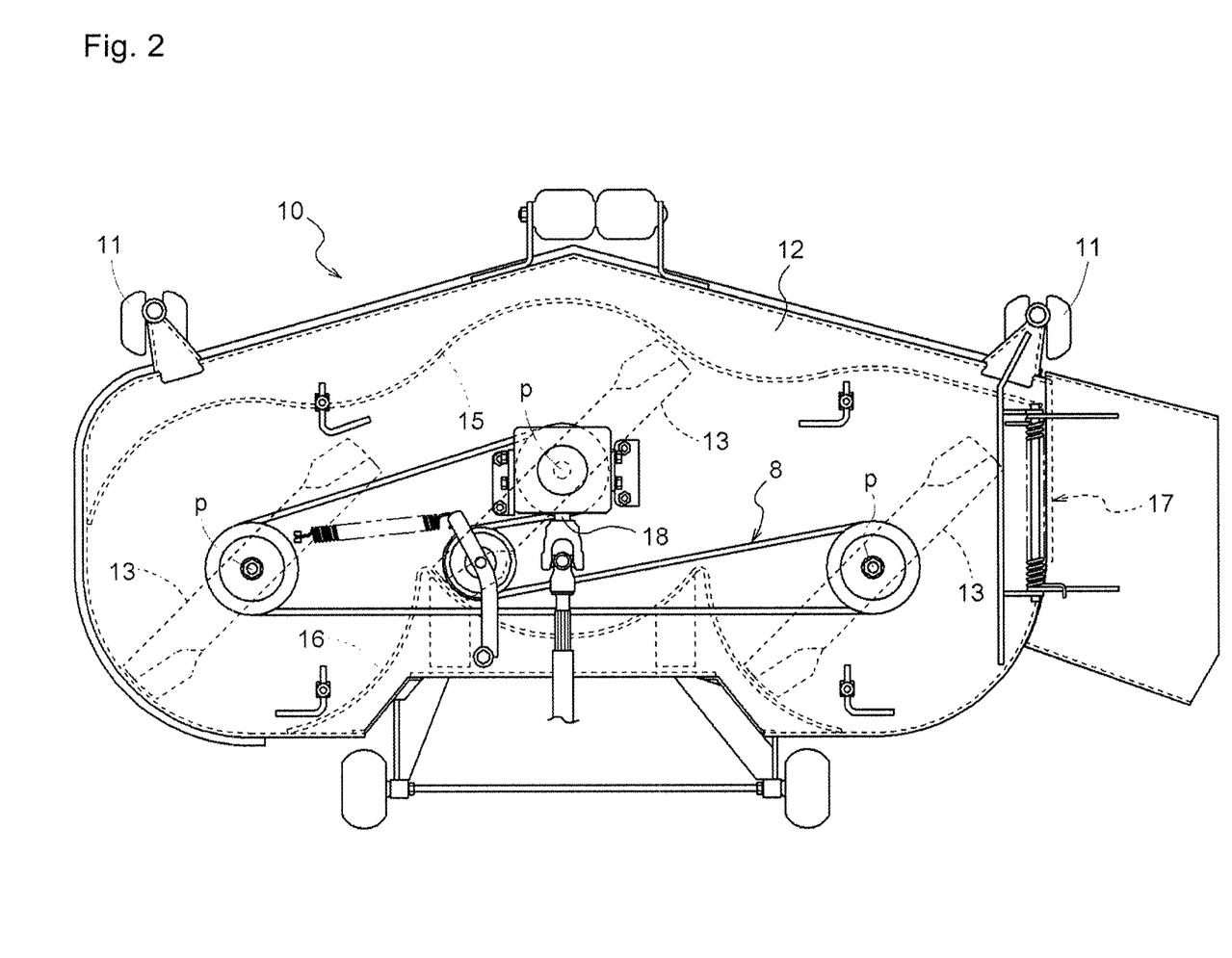
FIG. 2 is a top view of the mower.
Figure 3:
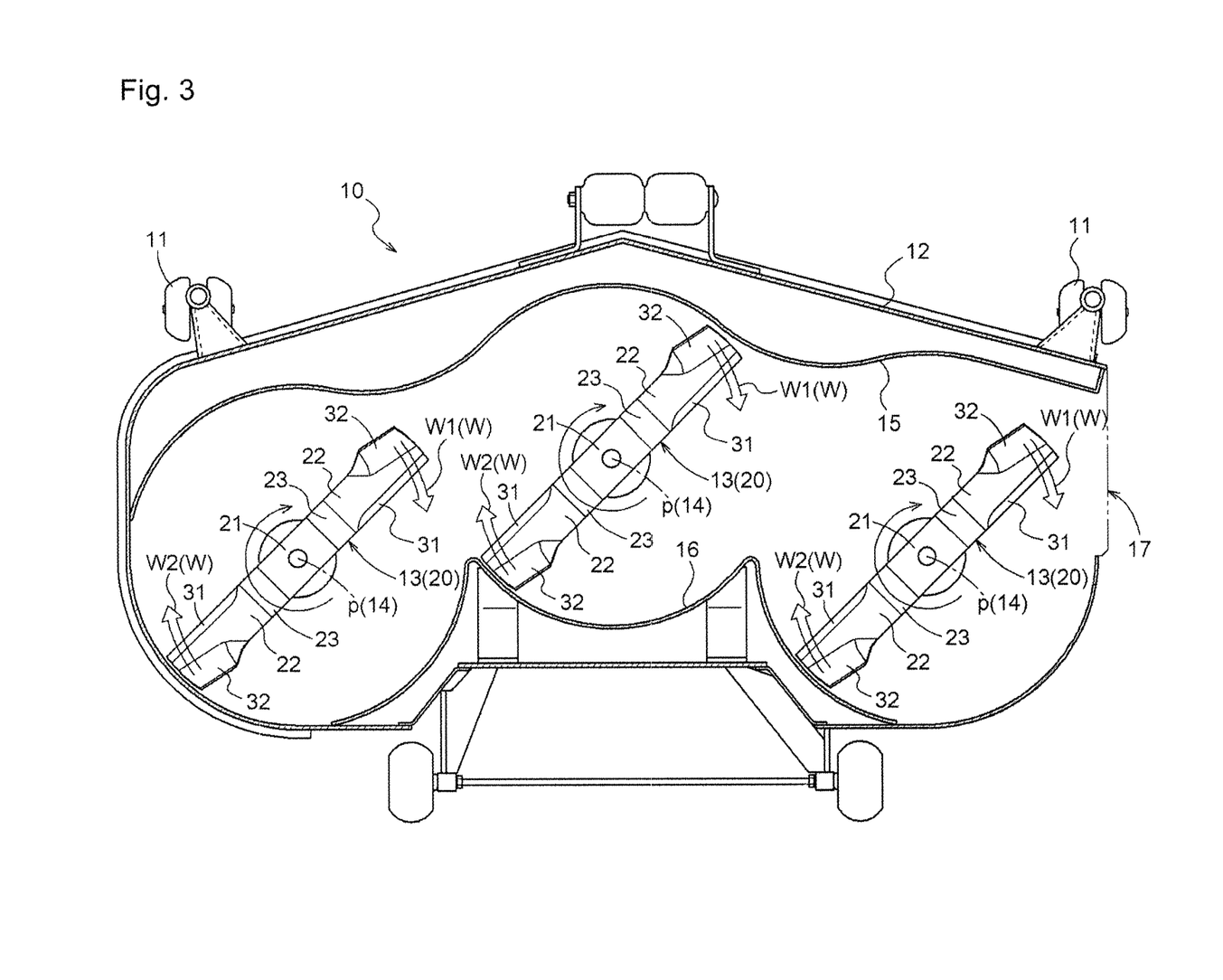
FIG. 3 is a plan view illustrating an interior of the mower.

As shown in FIGS. 2 and 3, the mower 10 includes the mower housing 12, a plurality of mower blades 13, and the like. Each mower blade 13 is arranged in the interior of the mower housing 12 so as to be rotatable around a vertical axis center "p". In the present embodiment, three mower blades 13 are aligned in a left-right direction, with each mower blade 13 being arranged on or mounted about a corresponding vertically-oriented rotation shaft 14. A baffle plate 15 having a wavy shape is utilized that follows a front side of the rotation trajectory traced by each of the mower blades 13 and is located on a front side of the mower housing 12 interior. A vacuum plate 16 having a wavy shape that follows a rear side of the rotation trajectory traced by each of the mower blades 13 is located on a rear side of the mower housing 12 interior. An exhaust mouth 17 is provided on a right end of the mower housing 12 to allow for the expelling of the cut grass. Power from a power transfer shaft 5a of the propulsion mechanism 5 is input through an intermediate shaft 19 to an input shaft 18 provided above the mower housing 12. The power input to the input shaft 18 is transmitted through a belt-type power distribution mechanism 8 to each of the rotation shafts 14. Each mower blade 13 is then driven to rotate around the vertical axis center "p".

Moreover, in the present embodiment, the three mower blades 13 are positioned in a triangular layout such that the center mower blade 13 is located further forward than the left and right mower blades 13 (see FIGS. 2 and 3). In this way, portions of the rotation trajectories traced by neighboring mower blades 13 can overlap in the left-right direction.

Figure 4:
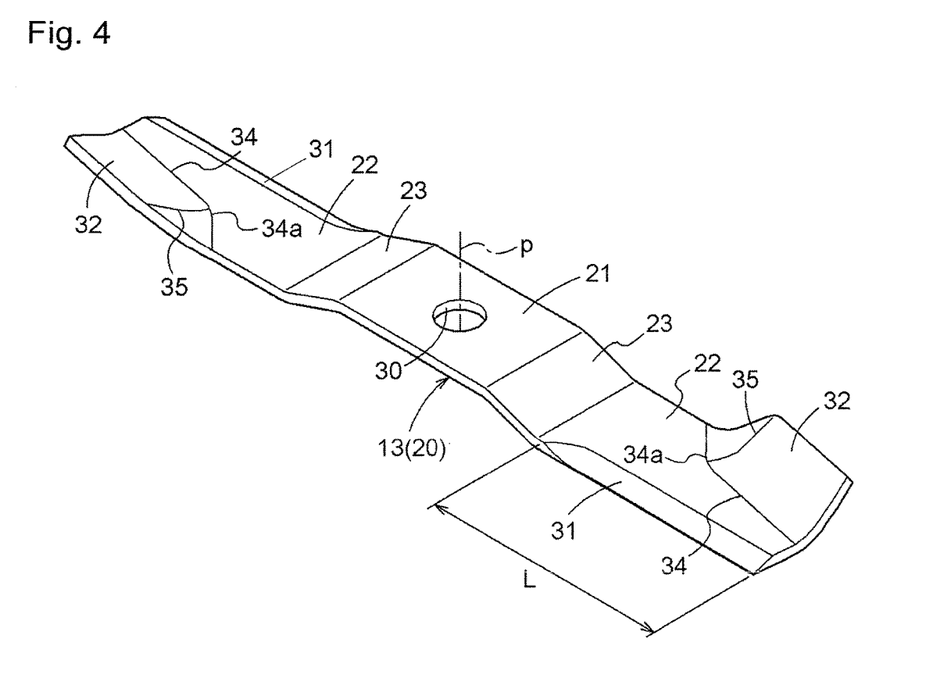
FIG. 4 is a perspective view illustrating the mower blade of the present invention.
Figure 5:
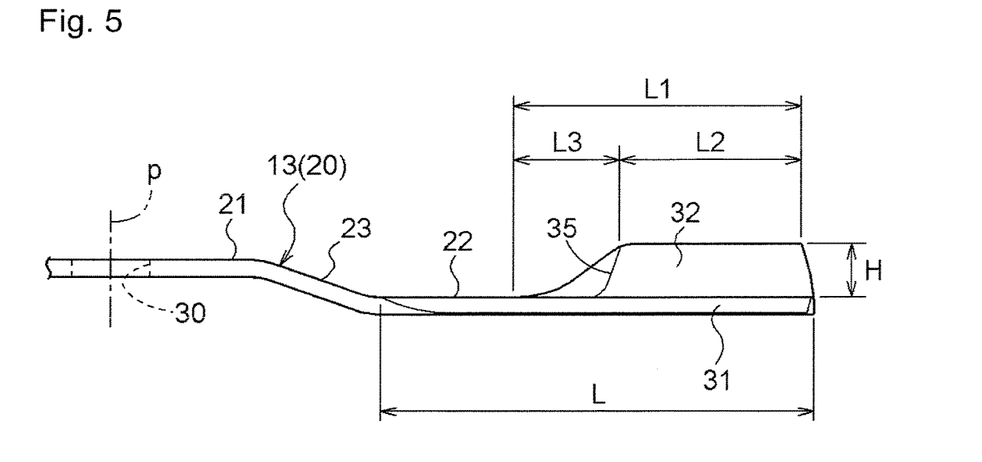
FIG. 5 is a front view of the mower blade.
Figure 6:
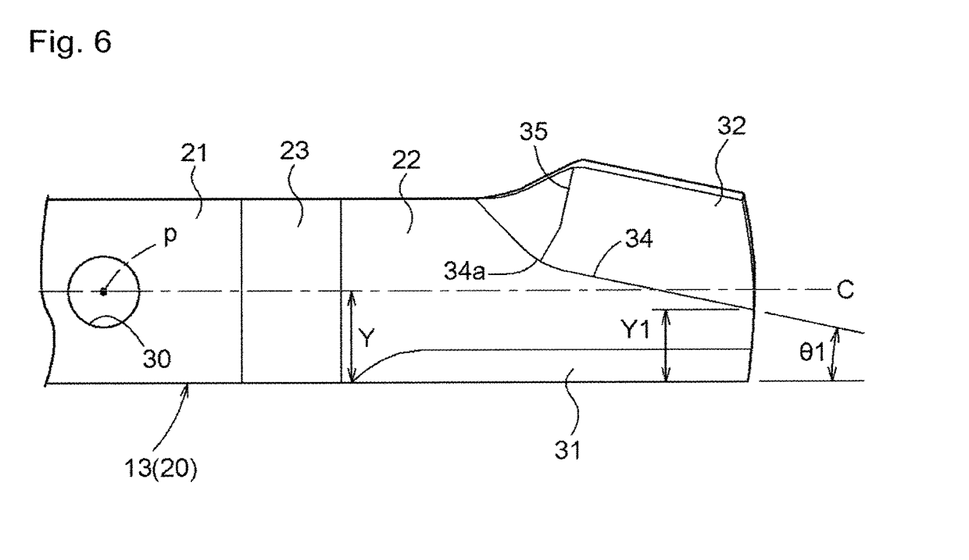
FIG. 6 is a top view of a portion of the mower blade.
Figure 7:
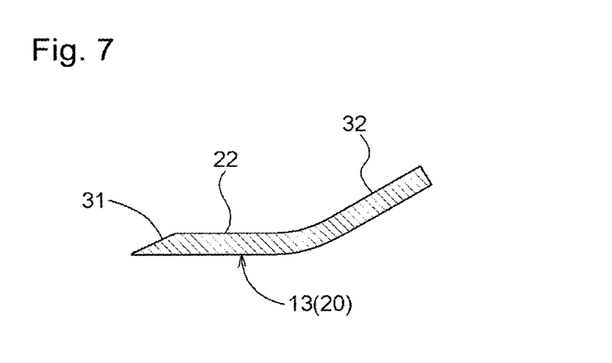
FIG. 7 is a cross-sectional view of a portion of the mower blade.

A structure of the mower blades 13 will now be described with reference to FIGS. 4-7 with FIG. 4 showing a perspective view of the mower blade, FIG. 5 showing a lateral view from one end of the mower blade, FIG. 6 showing a plan view and FIG. 7 showing a cross-sectional view of a portion of the blade 13. As shown in FIGS. 4 and 5, each blade 13 can have a blade main body 20 that includes, along a length direction, a first portion 21 having a hole 30 for mounting to a rotation shaft 14. A second portion 22 of the body 20 has a blade portion 31 and an air circulator portion 32. A third portion 23 is located between the first portion 21 and the second portion 22. Moreover, the first portion 21 can be positioned higher than the second portion 22 while the third portion 23 is inclined so as to decrease in height from the first portion 21 toward the second portion 22. As shown in FIG. 6, the leading edge of the blade main body 20, in terms of the direction of rotation of the blade 13, that is, along the first, second, and third portions, extend in a straight line.

As shown in FIG. 4, the second portion 22 and the third portion 23 can each be located at two opposite sides of the first portion 21. In other words, the first portion 21 is positioned at a center of the body 20 in the length direction while the third portion 23 is positioned on both outer sides of the first portion 21, and the second portion 22 is positioned on the outer side of each of the third portions 23. In the present embodiment, the blade main body 20 can be a single plate-shaped member and the first portion 21, the second portion 22, and the third portion 23 are formed by bending this plate-shaped member.

Referring again to FIG. 4, it can be seen that each of the second portions 22 includes the blade portion 31 and the air circulator portion 32. The blade portion 31 and the air circulator portion 32 are formed on respective, mutually diagonal lines on the second portion 22. Thus, the blade portion 31 is located on a front side (in the rotation direction) and the air circulator portion 32 is located on a rear side.

Referring to FIGS. 6 and 7, it can be seen that a portion of the second portion 22 on the blade main body 20 is bent upward, thus forming the air circulator portion 32. As is shown in FIG. 6, a boundary portion 34 (rising portion) is located between the blade main body 20 and the air circulator portion 32 and extends at an inclination such that, beginning at a length-direction end portion of the blade main body 20, the boundary portion 34 grows more distant from the blade portion 31 as the boundary portion 34 approaches a center of the blade main body 20, and such that, beginning at a width-direction intermediate portion of the blade main body 20, the boundary portion 34 approaches a width-direction end portion of the blade main body 20 on a side opposite the blade portion 31. The boundary portion 34 then intersects with the end portion (reaches the end portion). The boundary portion 34 also bends at an intermediate portion thereof so as to suddenly incline greatly toward the end portion of the blade main body 20 on the side opposite the blade portion 31. Similarly, the air circulator portion 32 extends at an inclination such that the air circulator portion 32 approaches the width-direction end portion of the blade main body 20 on the side opposite the blade portion 31. The air circulator portion 32 then bends at an intermediate portion thereof. The result is that a bent line 35 can be formed running from an upper end of the air circulator portion 32 to a bend 34a in the boundary portion 34.

Referring back to FIG. 5, it can be seen that, in a lateral view, a height H (from a flat portion of an upper surface of the second portion 22 to an upper end of the air circulator portion 32) can be substantially the same over an area L2 running from the end portion to the bend 34a (the upper end is substantially horizontal in the area L2). The height H then gently lowers or decreases in area L3 from the line of bending toward the width-direction end of the blade main body 20 on the side opposite the blade portion 31. As described above, the air circulator portion 32 can span from the end portion to the intermediate portion of the second portion 22.

It should be noted herein that the phrase "roughly the same height" as used herein may refer to a height that is effectively or approximately (though not exactly) the same. Specifically, a difference between the heights of a highest portion and a lowest portion of the height H may be 30% or less of the height of the highest portion. The difference is preferably 15% or less and is more preferably 10% or less. While not intended to be limiting, in the above-described embodiment, L2 may be 50% or more of L1, can preferably be 60% or more of L1, and is more preferably 70% or more of L1. In other words, by providing an area L2 where the height H is substantially the same across a somewhat lengthy area, airflow can be generated with stability.

As noted above, the length L1 along the length direction of the air circulator portion 32 is defined to be shorter than the length L along the length direction of the blade portion 31. Specifically, the length of L1 can be defined at approximately 25% to 75% of the length L, and is preferably defined at approximately 45% to 70% of the length L.

In other words, the length L1 of the air circulator portion 32 is defined to be a length necessary to achieve a required air circulation force while being defined to be shorter than the length L of the blade portion 31. By defining the length L1 of the air circulator portion 32 in this way, the air circulator portion 32 can be inclined with respect to the cutting edge of the blade 31 without occupying a large amount of space in the width direction of the blade main body 20. Therefore, a distance from the cutting edge of the blade portion 31 to the boundary portion 34 can be made larger. Thus, a sharpened area of the blade 31 can be larger and the mower blade 13 can last longer.

While not intended to be limiting, with the above-described configuration shown in FIG. 6, the above-described embodiment can include an air circulator portion 32 in which a distance Y1 (between the cutting edge on the outer end portion of the blade portion 31 and the boundary portion 34) and a distance Y (between the cutting edge on the length-direction center-side end portion of the blade portion 31 and the center line C) are substantially equal. Herein, "substantially equal" may refer to Y1 and Y being effectively or approximately (though not exactly) equal. Specifically, Y1 can be defined at approximately 60% to 140% of Y, is preferably 70% to 130% of Y, and is more preferably 80% to 120% of Y.

Although not intended to be limiting, as shown in FIG. 6, an angle θ1 can be utilized between the boundary portion 34 and the cutting edge of the blade portion 31 and can be approximately 10° to 30°, and is preferably defined to be approximately 15° to 25°, and more preferably is defined to be approximately 20°. By defining the angle θ1 in this way, the air circulator portion 32 can generate an airflow W (see FIG. 3) that is directed more towards an interior than a direction following the rotation direction of the mower blade 13 (a line tangential to the rotation trajectory of the outside end of the mower blade 13). Thus, as shown in FIG. 3, airflows W1 and W2 in adjacent portions of adjacent mower blades 13 can be inhibited or prevented from interfering with each other. As a result, the airflows W1 and W2, which are directed in mutually opposing directions, can be prevented from weakening each other's circulation force. In addition, disruption of the air current can be prevented. Thus, cut grass can be adequately transported while achieving reductions in rotation driving force and energy use.

Although the above-described embodiment is described with reference to an exemplary riding mower, e.g., having the mower 10 located between the front wheels 1 and the rear wheels 2 (below the vehicle body), the mower blade 13 can be used on other mowers and is not limited to the above riding mower. For example, the blade may be utilized on a riding mower having the mower 10 positioned on either a front or back of the vehicle body. The mower blade 13 can also be utilized on a push mower.

The inventive features of the present invention can thus be utilized on a mower blade for different types of mowers.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A multi-blade mower deck blade to be used with at least one adjacent mower deck blade, said mower deck blade rotatably driven and centered around a vertically-oriented axis in an interior of a housing, said mower deck blade comprising:
- a blade main body having a length-direction and being configured to rotate about an axis center of the blade main body, the blade main body comprising:
  - a first portion having a hole configured to receive a rotation shaft at the axis center;
  - opposite sides of the blade main body having same geometry blade portions and same geometry air circulator portions;
- each of the opposite sides of the blade main body further comprising:
  - a second portion comprising a length-direction end portion and positioned at a lower height than the first portion; and
  - a third portion located between the first portion and the second portion and inclined downwardly from the first portion to the second portion;
- each blade portion being arranged only in the second portion of the blade main body and extending along a predetermined area in the length-direction;
- each air circulator portion being located opposite each respective blade portion in a width direction, has a rising upward portion, and extends along a predetermined area in the length-direction;
- a boundary portion, arranged between the blade main body and each air circulator portion, has a portion inclined or angled with respect to each respective blade portion such that, beginning at the length-direction end portion, a distance between each respective boundary portion and each respective blade portion increases along the length-direction and moving toward the axis center;
- each boundary portion, beginning at a length-direction end, being angled and non-parallel relative to a plane bisecting the blade in the length-direction and passing through the axis center, the air circulator portion thereby being configured to generate an airflow in a direction inside of a mower blade rotation direction, said airflow non-interfering with an airflow of an air circulation portion of an adjacent mower deck blade;
- each boundary portion having a bend extending to a second portion inclined or angled by a greater amount than the portion of each boundary portion; and
- a height of an upper end portion of each respective air circulator portion measured from a surface of the blade main body is a substantially constant height,
- wherein:
  - the predetermined area of each blade portion has a first length;
  - the predetermined area of each air-circulator portion has a second length; and
  - a distance, measured in the length-direction, between the axis center and a beginning of the second length is greater than the second length.

2. The mower deck blade according to claim 1, wherein a distance between a cutting edge of each blade portion and a position where each respective boundary portion extends to a length-direction end portion, measured along the width direction, is substantially equal to a distance between an imaginary center line of the blade main body extending along the length-direction and each cutting edge of the blade portion.

3. A multi-blade mower deck blade to be used with at last one adjacent mower deck blade, said mower deck blade comprising:
- a blade main body having a length-direction, an axis center and opposite first and second cutting ends having a same geometry;
- in a plan view, the blade main body having a leading edge extending in a straight line from the axis center to a length-direction end;
- each of the first and second cutting ends comprising:
  - an air circulator portion arranged opposite a cutting portion;
  - the cutting portion extending to the length-direction end of the blade main body and extending along only a constant height in the length-direction; and
- a boundary line defined by where the air circulator portion meets a surface of the blade main body, the boundary line including a first portion extending from the length-direction end along the length-direction and at an angle relative to a plane bisecting the blade in the length-direction and passing through the axis center, the air circulator portion thereby being configured to generate an airflow in a direction inside of a mower blade rotation direction, said airflow non-interfering with an airflow of an air circulation portion of an adjacent mower deck blade,
- wherein a distance between the boundary line at the length-direction end and the cutting edge of the cutting portion is less than a distance between the boundary line and the cutting portion at a position spaced from the length-direction end, said position being defined by an imaginary line that passes through the axis center and intersects the boundary line at a point of intersection,
- wherein at a position spaced more greatly from the length-direction end than the point of intersection, the boundary line includes a second portion bend extending in a direction away from the cutting edge of the cutting portion;
- wherein a height of an upper end portion of the air circulator portion, measured from the surface of the blade main body, is a substantially constant height over a predetermined length, and
- wherein:
  - the predetermined area of the cutting portion has a first length;
  - the air circulation portion has a second length measured in the length-direction;
  - a middle portion of the blade main body contains the axis center, extends to a beginning of each respective said cutting portion, and has a third length measured in the length-direction; and
  - at least one of:
    - the first length is less than the third length; and/or
    - the second length is less than the third length.

4. The mower deck blade according to claim 3, wherein the first length is greater than the second length.

5. A multi-blade mower deck blade to be used with at last one adjacent mower deck blade, said mower deck blade comprising:
a blade main body having a centrally disposed mounting hole, a length-direction and oppositely arranged first and second cutting ends;
in a plan view, the blade main body having a leading edge extending in a straight line from the axis center to a length-direction end;
each of the first and second cutting ends being geometrically the same and comprising:
an air circulator portion arranged opposite a cutting portion, the cutting portion extending along only a constant height in the length-direction; and
a boundary line defined by where the air circulator portion meets a surface of the blade main body, the boundary line extending along the length-direction and, beginning at a length-direction end, at an angle that is not parallel to an imaginary centerline that bisects the blade main body while passing through a center of the mounting hole and extending along the length-direction, the air circulator portion thereby being configured to generate an airflow in a direction inside of a mower blade rotation direction, said airflow non-interfering with an airflow of an air circulation portion of an adjacent mower deck blade;
wherein the distance between a first portion of the boundary line and the imaginary center line changes continuously by a first amount and the distance between a second portion of the boundary line and the imaginary center line changes continuously by a second greater amount,
wherein the boundary line includes a second portion connected by a bend to the first portion, the second portion being inclined relative to the imaginary centerline more greatly that the first portion, and
wherein:
the cutting portion has a first length measured in the length-direction;
the air circulator portion has a second length measured in the length-direction;
a middle portion of the blade main body contains the mounting hole, extends to a beginning of each respective cutting portion, and has a third length measured in the length-direction; and
each of:
the first length is less than the third length; and
the second length is less than the third length, and
wherein a length, measured in the length-direction, from the center of the mounting hole to a start of each respective air circulator portion is greater than the first length.

6. The mower deck blade according to claim 5, wherein a height of an upper end portion of the air circulator portion measured from the surface of the blade main body is a substantially constant height over a predetermined length.

7. The mower deck blade according to claim 5, wherein a distance between all portions of the boundary line and the imaginary center line changes continuously.

8. The mower deck blade according to claim 5, wherein the air circulator portion comprises:
a main air circulator portion;
a smaller area air circular portion; and
a boundary line arranged between the main air circulator portion and the smaller area air circulator portion.

9. The mower deck blade according to claim 8, wherein a height of an upper end portion of the main air circulator portion measured from the surface of the blade main body is a substantially constant height over a predetermined length.

10. The mower deck blade according to claim 8, wherein a height of an upper end portion of the smaller area air circulator portion measured from the surface of the blade main body changes continuously over a predetermined length.

11. A multi-blade mower deck blade to be used with at last one adjacent mower deck blade, said mower deck blade comprising:
a blade main body comprising:
a length-direction;
a middle blade portion comprising an axis center;
opposite geometrically identically configured end areas; and
an intermediate portion disposed between each opposite end area and the middle blade portion;
in a plan view, the blade main body having a leading edge extending in a straight line along the middle portion, intermediate portion, and end area;
each end area being spaced in a height-direction relative to the middle blade portion and comprising:
a cutting portion having a first length measured in the length-direction, the cutting portion extending along only a constant height in the end area;
an air circulator portion having a second length measured in the length direction; and
a boundary portion defining a bottom end portion of the air circulator portion and being inclined or angled with respect to the cutting portion such that the boundary portion and the cutting portion are not parallel to one another and a distance between the boundary portion and the cutting portion increases, beginning at a length-direction end, along the length-direction and moving toward the axis center;
the boundary portion being angled and non-parallel relative to a plane bisecting the blade in the length-direction and passing through the axis center, the air circulator portion thereby being configured to generate an airflow in a direction inside of a mower blade rotation direction, said airflow non-interfering with an airflow of an air circulation portion of an adjacent mower deck blade;
the boundary portion having a first portion and a longer second portion with the first portion being inclined or angled by a greater amount than the second portion; and
a height of an upper end portion of the air circulator portion measured from a surface of the blade main body is a substantially constant height.

12. The mower deck blade according to claim 11, wherein:
the intermediate portion has a third length measured in the length-direction;
the middle blade portion has a fourth length measured in the length-direction; and
at least one of:
the third length is less than a difference between the first and second lengths;
the third length is less half of the fourth length; and/or
the second length is more than the third length and less than the first length.

13. The mower deck blade according to claim 11, wherein:
the intermediate portion has a third length measured in the length-direction;

the middle blade portion has a fourth length measured in the length-direction; and each of:

the third length is less than a difference between the first and second lengths;

the third length is less half of the fourth length; and the second length is more than the third length and less than the first length.

14. The mower deck blade according to claim 1, wherein said distance, measured in the length-direction, between the axis center and the beginning of the second length is greater than the second length.

15. The mower deck blade according to claim 3, wherein each of:

the first length is less than the third length;

the second length is less than the third length; and each boundary line has portions that are arranged on opposite sides of an imaginary line passing through the axis center and oriented along the length-direction.

16. The mower deck blade according to claim 5, wherein each first portion of each boundary line has portions that are arranged on opposite sides of the imaginary centerline.

17. The mower deck blade according to claim 1, wherein:

in a plan view, the blade main body has a leading edge extending in a straight line along the first, second, and third portions.

18. The mower deck blade according to claim 1, wherein: the second length of the air circulation portion is 45% to 70% of the first length of the cutting portion.

19. The mower deck blade according to claim 3, wherein: the second length of the air circulation portion is 45% to 70% of the first length of the cutting portion.

20. The mower deck blade according to claim 5, wherein: the second length of the air circulation portion is 45% to 70% of the first length of the cutting portion.

21. The mower deck blade according to claim 11, wherein:

the second length of the air circulation portion is 45% to 70% of the first length of the cutting portion.

22. The mower deck blade according to claim 1, wherein:

for each of the opposite sides of the blade main body, the boundary portion is angled with respect to each respective blade portion by 10 to 30 degrees.

23. The mower deck blade according to claim 3, wherein: the angle is within a range of 10 to 30 degrees.

24. The mower deck blade according to claim 5, wherein: the angle is within a range of 10 to 30 degrees.

25. The mower deck blade according to claim 11, wherein:

for each of the opposite end areas of the blade main body, the boundary portion is angled with respect to the plane bisecting the blade in the length direction by 10 to 30 degrees.

* * * * *

UNITED STATES PATENT AND TRADEMARK OFFICE
CERTIFICATE OF CORRECTION

PATENT NO. : 10,440,885 B2
APPLICATION NO. : 14/015111
DATED : October 15, 2019
INVENTOR(S) : Shiotsuki et al.

It is certified that error appears in the above-identified patent and that said Letters Patent is hereby corrected as shown below:

In the Claims

At Column 8, Line 9 (Claim 3, Line 1), please change "last" to -- least --.
At Column 9, Line 1 (Claim 5, Line 1), please change "last" to -- least --.
At Column 10, Line 8 (Claim 11, Line 1), please change "last" to -- least --.

Signed and Sealed this
Twenty-fifth Day of February, 2020

Andrei Iancu
*Director of the United States Patent and Trademark Office*